United States Patent
Zhang et al.

(10) Patent No.: US 12,085,117 B2
(45) Date of Patent: Sep. 10, 2024

(54) QUICK-CHANGE LOCK ASSEMBLY AND LOCKING DEVICE USING SAME

(71) Applicant: CONTEMPORARY AMPEREX TECHNOLOGY CO., LIMITED, Ningde (CN)

(72) Inventors: Wenhui Zhang, Ningde (CN); Shubing You, Ningde (CN); Haihua Huang, Ningde (CN); Yuanhe Wu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/600,650

(22) Filed: Mar. 9, 2024

(65) Prior Publication Data
US 2024/0229838 A1   Jul. 11, 2024

Related U.S. Application Data

(63) Continuation of application No. PCT/CN2021/119184, filed on Sep. 17, 2021.

(51) Int. Cl.
*F16B 39/12* (2006.01)
*B60K 1/04* (2019.01)
(Continued)

(52) U.S. Cl.
CPC .............. *F16B 5/0208* (2013.01); *B60K 1/04* (2013.01); *F16B 5/0266* (2013.01);
(Continued)

(58) Field of Classification Search
CPC .... F16B 5/0208; F16B 5/0266; F16B 37/044; B60K 1/04; B60K 2001/0455; B60L 53/80
(Continued)

(56) References Cited

U.S. PATENT DOCUMENTS 4,794,899 A * 1/1989 Bruhmann .............. F16F 1/041
                                                    123/364
2012/0057947 A1   3/2012 Chiu
(Continued)

FOREIGN PATENT DOCUMENTS

CN      2500857 Y   7/2002
CN    106274434 A   1/2017
(Continued)

OTHER PUBLICATIONS

The international search report received in the corresponding international application PCT/CN2021/119184, mailed Mar. 30, 2022, 6 pages.
(Continued)

*Primary Examiner* — Gary W Estremsky
(74) *Attorney, Agent, or Firm* — Kilpatrick Townsend & Stockton LLP

(57) ABSTRACT

A quick-change lock assembly is provided, which in some embodiments comprises: a shell with a hollow cavity formed therein; a quick-change bolt which is arranged in the cavity, is capable of moving axially to protrude from the cavity or being accommodated in the cavity, and is internally provided with a through hole along the axial direction; a bolt driving rod comprising: a bolt matching section slidably inserted into the through hole, and matched with the through hole such that the quick-change bolt is rotatable with the bolt driving rod; a flange portion, a first side surface, opposite to the quick-change bolt, of which is capable of pushing the quick-change bolt to move axially; and a tool matching section; an elastic member, both ends of which respectively abut against the inner top wall of the shell and the first side surface of the flange portion.

12 Claims, 6 Drawing Sheets

(51) Int. Cl.
  *F16B 5/02* (2006.01)
  *F16B 37/04* (2006.01)
  *B60L 50/64* (2019.01)
  *B60L 53/80* (2019.01)

(52) U.S. Cl.
  CPC .... *F16B 37/044* (2013.01); *B60K 2001/0455* (2013.01); *B60L 50/64* (2019.02); *B60L 53/80* (2019.02)

(58) Field of Classification Search
  USPC .......................................................... 411/222
  See application file for complete search history.

(56) References Cited

U.S. PATENT DOCUMENTS

| | | | | |
|---|---|---|---|---|
| 2012/0099943 | A1* | 4/2012 | Chiu | F16B 5/0208 411/347 |
| 2012/0291250 | A1* | 11/2012 | Escande | B60L 53/80 29/525 |
| 2013/0104837 | A1* | 5/2013 | Sengstock | F02F 7/006 123/193.5 |
| 2018/0021860 | A1* | 1/2018 | Craig | F16B 19/109 408/103 |
| 2018/0062129 | A1* | 3/2018 | Hao | H01M 50/262 |
| 2018/0201110 | A1 | 7/2018 | Yin et al. | |
| 2019/0184920 | A1* | 6/2019 | Chen | B60R 16/04 |
| 2020/0094666 | A1* | 3/2020 | Bengtsson | F16B 19/02 |
| 2020/0124081 | A1* | 4/2020 | Bengtsson | B60K 1/04 |
| 2020/0321572 | A1* | 10/2020 | Bengtsson | H01M 50/264 |
| 2021/0123470 | A1* | 4/2021 | Webb | H01J 37/3171 |

FOREIGN PATENT DOCUMENTS

| | | |
|---|---|---|
| CN | 208559001 U | 3/2019 |
| CN | 209096458 U | 7/2019 |
| CN | 209675341 U | 11/2019 |
| EP | 3564055 A1 | 11/2019 |
| GB | 828194 A | 2/1960 |
| JP | 2010196791 A | 9/2010 |

OTHER PUBLICATIONS

The written opinion of ISA received in the corresponding international application PCT/CN2021/119184, mailed Mar. 30, 2022, 6 pages.
The extended European search report received in the corresponding European application 21948707.1, mailed Oct. 6, 2023, 5 pages.
Decision to Grant a Patent received in the corresponding Japanese application 2023-501833, mailed Oct. 17, 2023, 4 pages.

* cited by examiner

QUICK-CHANGE LOCK ASSEMBLY AND LOCKING DEVICE USING SAME

CROSS REFERENCE TO RELATED APPLICATIONS

The present application is a continuation of International Application PCT/CN2021/119184, filed on Sep. 17, 2021 and entitled "QUICK-CHANGE LOCK ASSEMBLY AND LOCKING DEVICE USING SAME", the entire disclosure of which is incorporated herein by reference.

TECHNICAL FIELD

The present application relates to the technical field of locking, and more particularly relates to a quick-change lock assembly for a battery and a locking device using the same.

BACKGROUND ART

In recent years, with the rapid development of new energy vehicles, the global sales of new energy vehicles have continued to grow. However, the charging time of the power battery of the new energy vehicle is long, and such problem is generally solved by adopting a method for quickly changing the power battery. According to such battery change mode, the purpose of supplementing electric energy of the new energy vehicle is achieved by directly changing the battery pack of the new energy vehicle, rapid electric energy supplement can be realized, and meanwhile, battery maintenance and service life prolonging are facilitated.

However, a current locking device for locking the battery pack to the vehicle body requires a large amount of space. Therefore, it is desirable to provide a locking device which requires less space, can realize high fastening performance, and has an anti-loosening structure with high reliability.

SUMMARY OF THE INVENTION

The present application provides a quick-change lock assembly and a locking device using the same.

In a first aspect, provided is a quick-change lock assembly, comprising: a shell with a hollow cavity formed therein; a quick-change bolt arranged in the cavity, and internally provided with a through hole along the axial direction, the quick-change bolt being capable of moving axially to protrude from the cavity or be accommodated in the cavity; a bolt driving rod, comprising a bolt matching section, a flange portion and a tool matching section, wherein the bolt matching section is configured to be slidably inserted into the through hole, and matched with the through hole such that the quick-change bolt is able to rotate with the bolt driving rod, and a first side surface, opposite to the quick-change bolt, of the flange portion is configured to be able to push the quick-change bolt to move axially; an elastic member, both ends of which respectively abut against the inner top wall of the shell and the first side surface of the flange portion; and a locking mechanism fixed to the shell, wherein the locking mechanism abuts against a second side surface of the flange portion, the locking mechanism is provided with an opening from which the tool matching section protrudes, and the second side surface is located on the opposite side of the first side surface; wherein first anti-loosening teeth are provided on the second side surface of the flange portion, and the locking mechanism is provided with second anti-loosening teeth adapted to be engaged with the first anti-loosening teeth for locking or disengaged from the same for unlocking. According to the configuration of the quick-change lock assembly of the present application, the installation space needed by the locking device can be greatly reduced, and meanwhile, high fastening performance as well as anti-loosening and anti-rotation performance with high reliability can be achieved.

In some embodiments, the first anti-loosening teeth and the second anti-loosening teeth are inclined toothed structures. The quick-change bolt can be better prevented from loosening by using the anti-loosening teeth with the inclined toothed structures.

In some embodiments, the angle of inclination of the first anti-loosening teeth and the second anti-loosening teeth is 30°-60°. By setting the angle of inclination of the anti-loosening teeth to be 30°-60°, the anti-loosening and anti-rotation effects can be optimally achieved.

In some embodiments, the quick-change bolt is provided with a trapezoidal thread. By means of such configuration, the service life of the quick-change bolt can be improved.

In some embodiments, the through hole comprises a first through hole section and a second through hole section, wherein the cross section of the first through hole section is less than the cross section of the second through hole section. The bolt matching section comprises a guide portion and a driving portion, wherein the guide portion is configured to be inserted into the first through hole section to guide the insertion of the bolt driving rod, and the driving portion is configured to be inserted into the second through hole section to be matched with the second through hole section, enabling the quick-change bolt to rotate with the bolt driving rod. By means of such configuration, since the first through hole section can be thinner than the second through hole section, the rigidity of the quick-change bolt can be enhanced.

In some embodiments, the cross sections of the driving portion and the second through hole section are polygonal, or the driving portion is in spline fit with the second through hole section. By means of such configuration, the quick-change bolt can be driven by the bolt driving rod in a simple manner.

In some embodiments, a boss is formed at the top of the shell, and the outer ring of the boss has a toothed structure. By means of interference fit of the toothed structure, the shell of the quick-change lock assembly is pressed into a battery pack beam, such that quick installation of the quick-change lock assembly and the battery pack beam can be achieved.

In a second aspect, provided is a locking device, comprising the quick-change lock assembly as described above; and a nut assembly comprising a quick-change nut, the quick-change nut comprising a nut body in which a through threaded hole matched with the quick-change bolt is formed. By using the quick-change lock assembly of the present application, the installation space needed by the locking device can be greatly reduced, and meanwhile, high fastening performance as well as anti-loosening and anti-rotation performance with high reliability can be achieved.

In some embodiments, the nut assembly further comprises: a cover plate; and a base, the cover plate being fixedly connected to the base, and an accommodating space being formed between the cover plate and the base; wherein the quick-change nut further comprises a cap portion connected to the nut body, the cap portion is arranged in the accommodating space, the base is provided with an opening from which the nut body protrudes, and the accommodating space is configured to allow the quick-change nut to move within a predetermined range. By means of such configuration, when the axis of the quick-change bolt and the axis of the quick-change nut are not in a straight line, the quick-change bolt and the quick-change nut can be better aligned.

In some embodiments, a flanging is provided on the base and/or the cover plate, and the flanging is configured to limit the rotation of the quick-change nut relative to the base and/or the cover plate. Through arrangement of the flanging, when the quick-change bolt and the quick-change nut are tightened, the quick-change nut can be prevented from rotating relative to the base and/or the cover plate.

In some embodiments, the cover plate is provided with an opening from which the quick-change bolt protrudes. Through the arrangement of such opening, the nut assembly is allowed to adapt to the quick-change bolts with different lengths.

In a third aspect, provided is a vehicle, comprising: a battery pack beam with a hole formed therein; a vehicle body beam with a groove formed therein; and the locking device as described above, wherein the nut assembly is fixed into the groove of the vehicle body beam, and the quick-change lock assembly is fixed into the hole of the battery pack beam. By means of such configuration, the installation space needed by the locking device can be further reduced.

According to the locking device of the present application, particularly the quick-change lock assembly of the present application, the problem about the installation space needed by a quick-change lock can be reduced, convenient assembly and replacement can be achieved, assembly alignment is simple, and assembly efficiency is high.

DESCRIPTION OF DRAWINGS

The drawings described herein are intended to provide a further understanding of the present application, which constitute a part of the present application. The illustrative embodiments of the present application and the description thereof are for explaining the present application and do not constitute an undue limitation of the present application. In the drawings.

DETAILED DESCRIPTION

Figure 1:
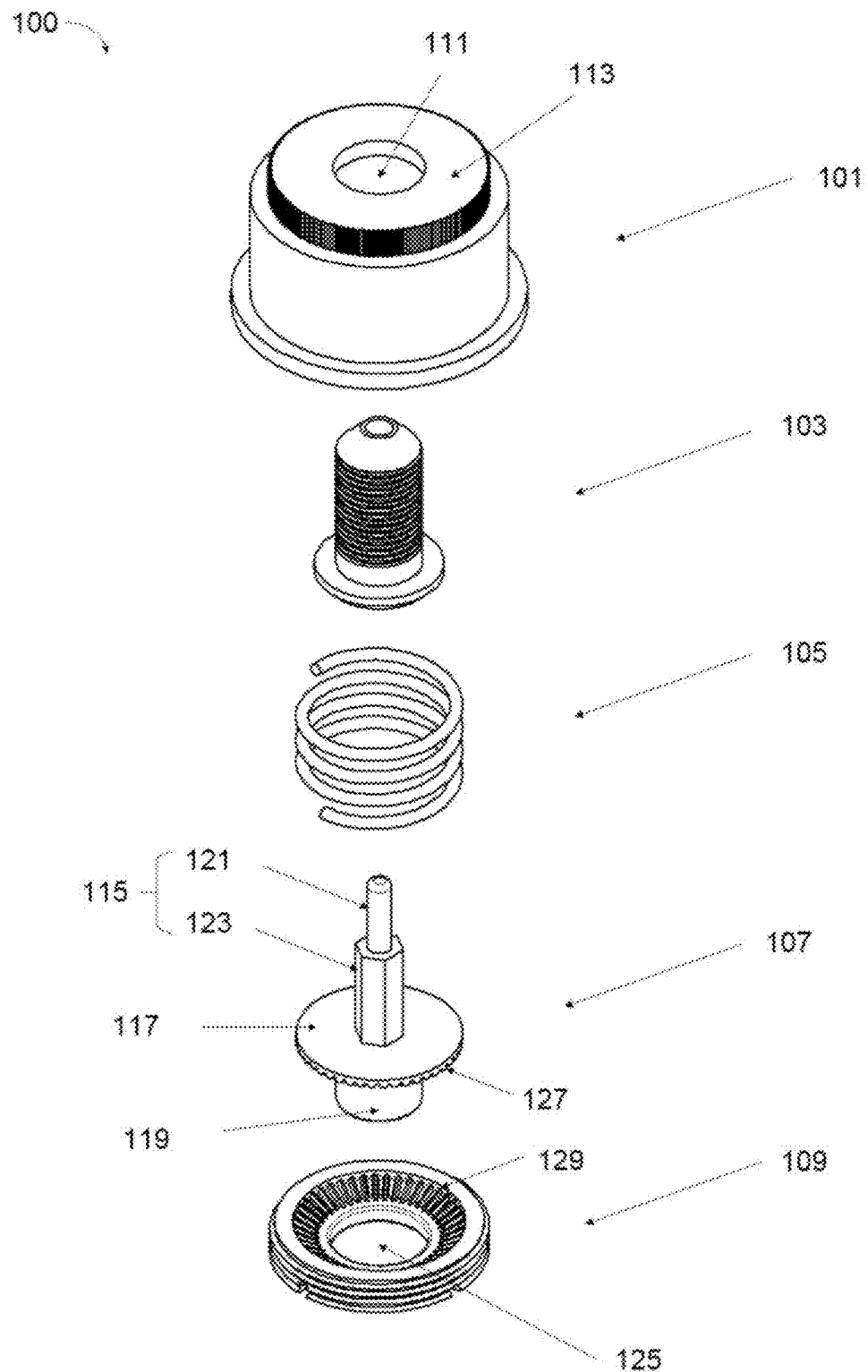
FIG. 1 is a schematic exploded diagram of a quick-change lock assembly in a locking device according to some embodiments of the present application.

In order to make the objects, technical solutions and advantages of embodiments of the present application clearer, the technical solutions in the embodiments of the present application will be clearly described below with reference to the drawings for the embodiments of the present application. Apparently, the described embodiments are some of, rather than all of, the embodiments of the present application. Based on the embodiments in the present application, all other embodiments obtained by those of ordinary skill in the art without creative effort fall within the protection scope of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the drawings are intended to cover non-exclusive inclusions. The terms "first", "second" and the like in the specification and the claims of the present application as well as the above drawings are used to distinguish different objects, rather than to describe a specific order or primary-secondary relationship.

Reference herein to "embodiment" means that a particular feature, structure, or characteristic described in connection with the embodiment may be included in at least one embodiment of the present application. The appearance of this phrase in various places in the specification does not necessarily refer to the same embodiment, nor is a separate or alternative embodiment that is mutually exclusive of other embodiments. It is understood explicitly and implicitly by those skilled in the art that the embodiments described in the present application can be combined with other embodiments.

In the description of the present application, it should be noted that the terms "mounting", "connecting", "connection" and "attachment" should be understood in a broad sense, unless otherwise explicitly specified or defined. For example, it may be a fixed connection, a detachable connection, or an integrated connection; and it may be a direct connection or an indirect connection through an intermediate medium, or may be a communication between the interior of two elements. For those of ordinary skill in the art, the specific meanings of the above terms in the present application can be understood according to specific situations.

In the present application, the term "and/or" is only an association relationship for describing associated objects, indicating that three relationships may exist. For example, A and/or B may represent three situations: A exists alone, both A and B exist, and B exists alone. In addition, the character "/" in the present application generally means that the associated objects before and after it are in an "or" relationship.

In the present application, "a plurality of" means two or more (comprising two), similarly, "a plurality of groups" means two or more groups (comprising two groups), and "a plurality of sheets" means two or more sheets (comprising two sheets).

The battery mentioned in embodiments of the present application refers to a single physical module comprising a plurality of battery cells to provide higher voltage and capacity. For example, the battery mentioned in the present application may include a battery module, a battery pack, or the like.

The present application provides a quick-change lock assembly which requires less space, can achieve high fastening performance, and meanwhile has an anti-loosening structure with high reliability, as well as a locking device using the quick-change lock assembly.

Hereinafter, embodiments of the present application will be described in detail with reference to the accompanying drawings.

A locking device 300 of the present application comprises a quick-change lock assembly 100 and a nut assembly 200.

Figure 2:
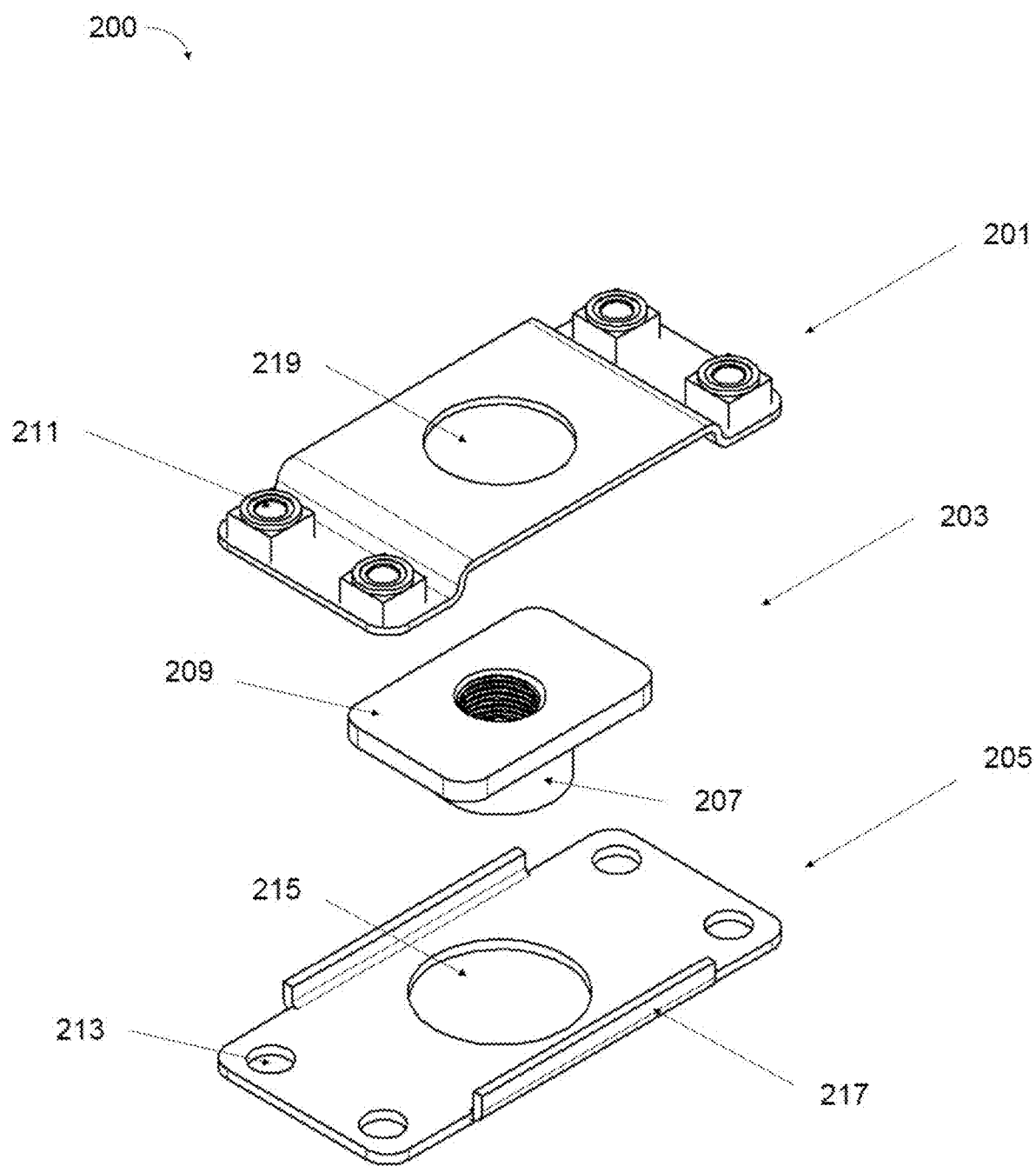
FIG. 2 is a schematic exploded diagram of a nut assembly in a locking device according to some embodiments of the present application.
Figure 3:
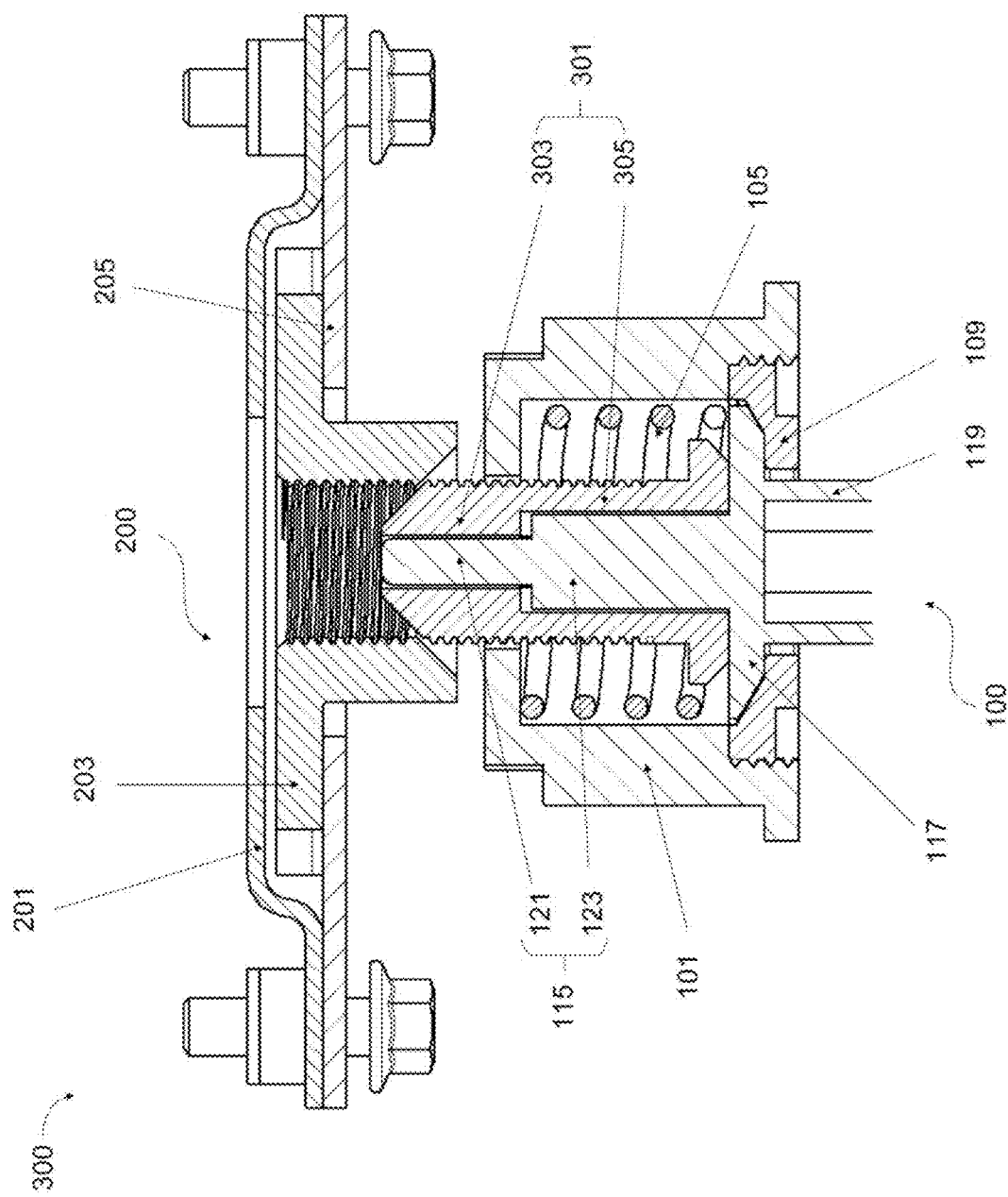
FIG. 3 is a sectional view of a locking device comprising a quick-change lock assembly and a nut assembly according to some embodiments of the present application.
Figure 4:
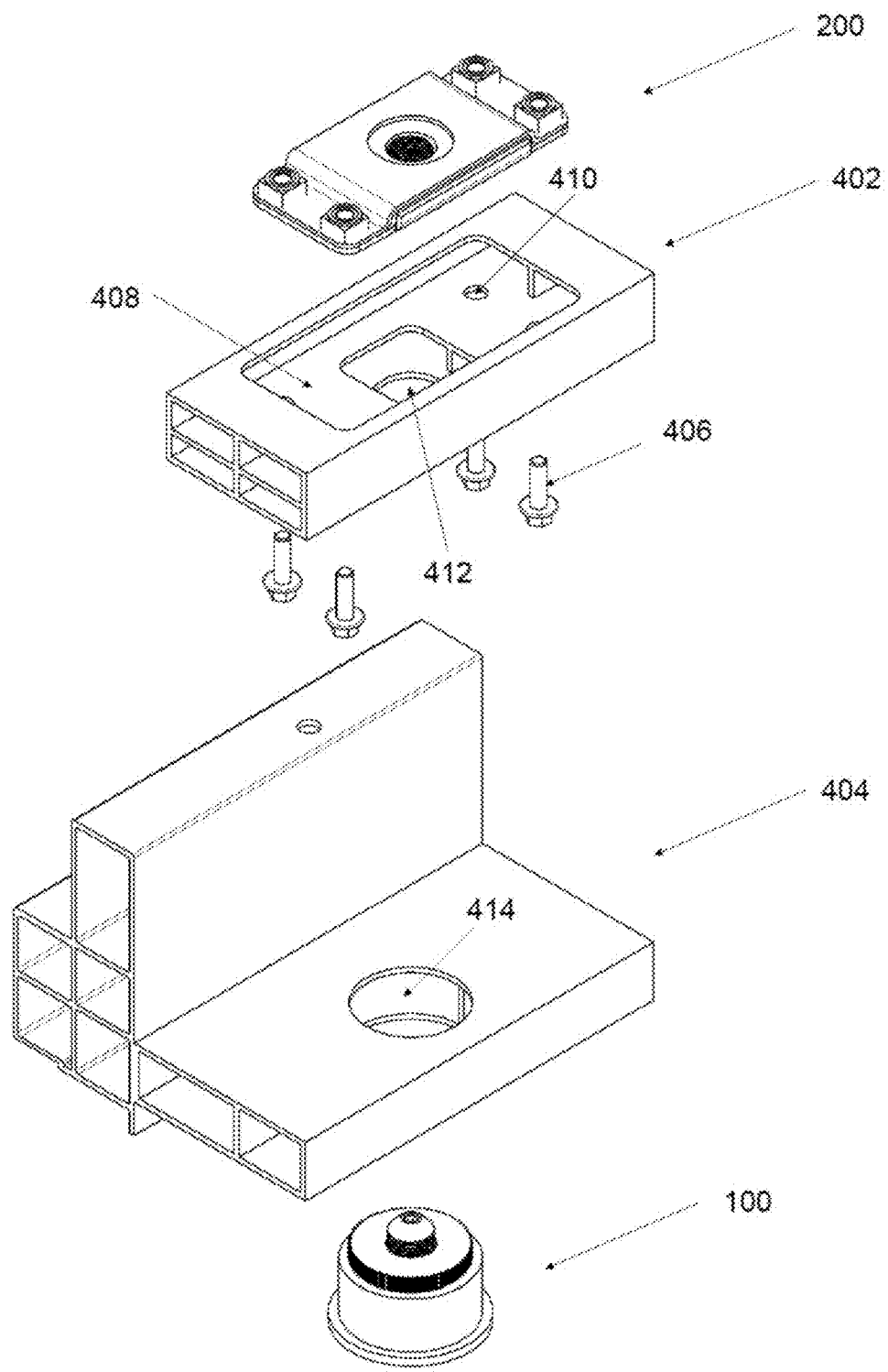
FIG. 4 is a schematic diagram showing a state in which a quick-change lock assembly and a nut assembly of a locking device according to some embodiments of the present application are respectively installed on a battery pack beam and a vehicle body beam.
Figure 5:
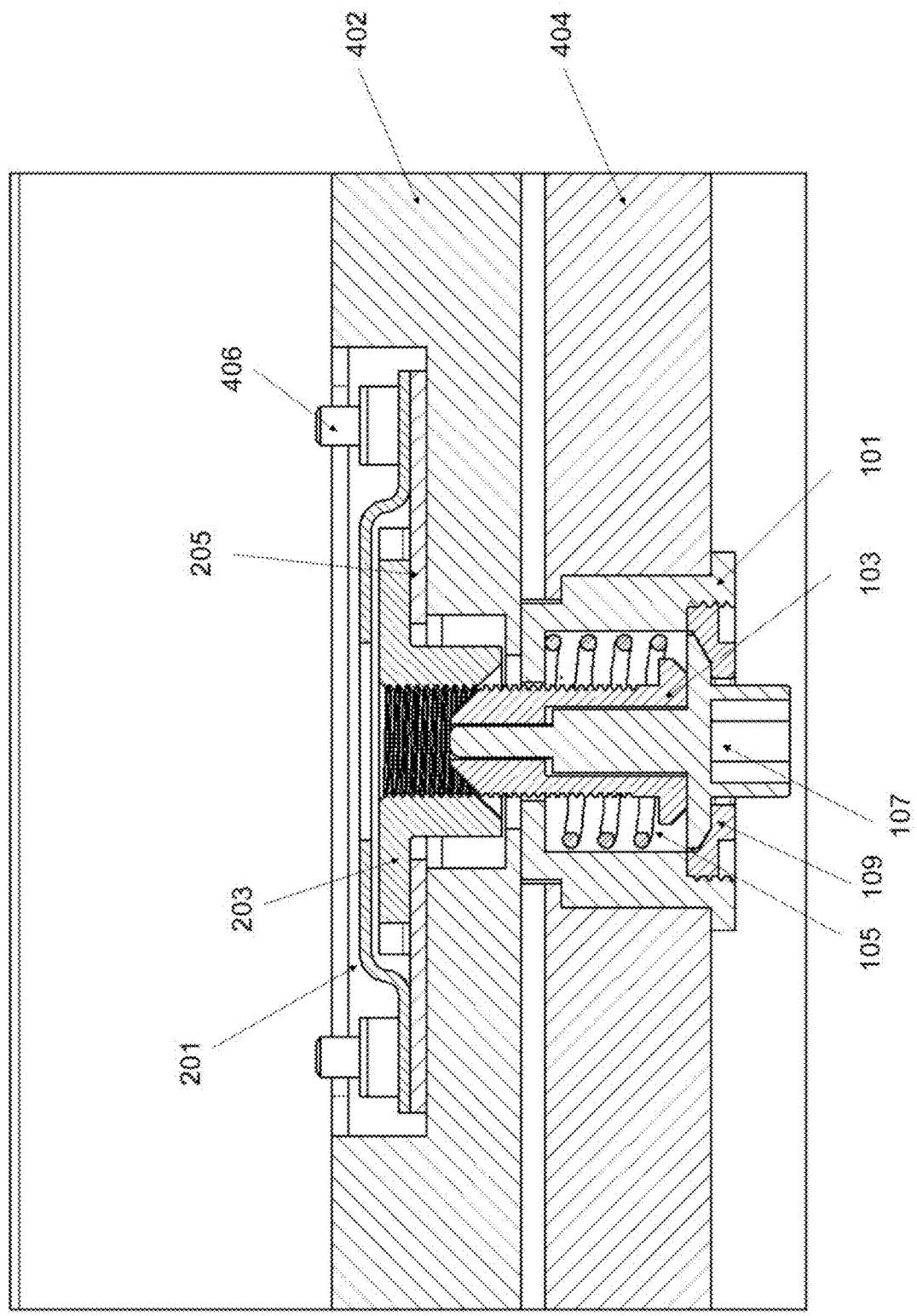
FIG. 5 is a sectional view of a state before a quick-change lock assembly is installed on a nut assembly.
Figure 6:
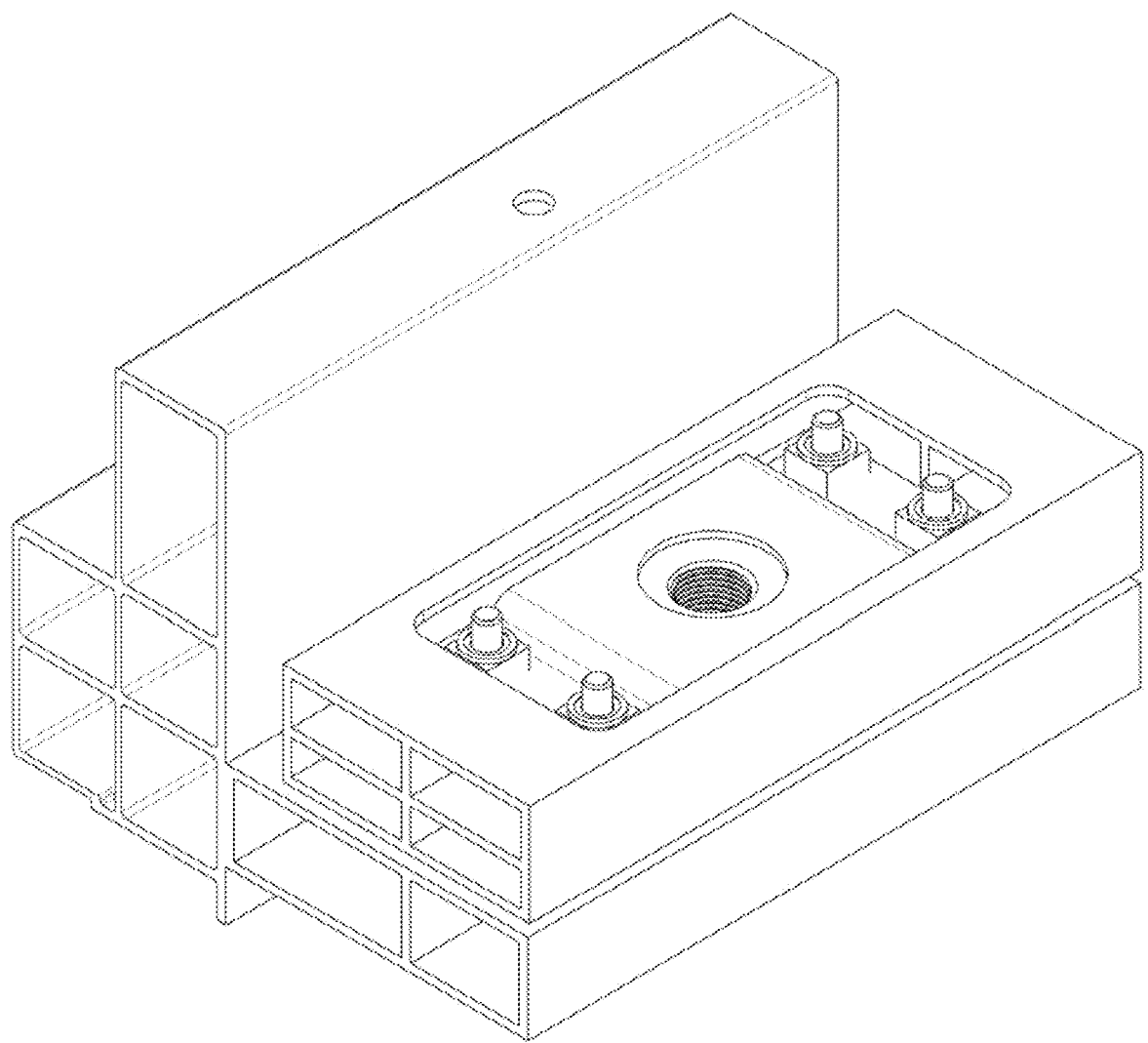
FIG. 6 is a schematic diagram illustrating a state after a battery pack beam is locked to a vehicle body beam using a locking device according to some embodiments of the present application.

FIG. 1 is a schematic exploded diagram of a quick-change lock assembly in a locking device according to some embodiments of the present application. FIG. 2 is a schematic exploded diagram of a nut assembly in a locking device according to some embodiments of the present application. FIG. 3 is a sectional view of a locking device comprising a quick-change lock assembly and a nut assembly according to some embodiments of the present application. FIG. 4 is a schematic diagram showing a state in which a quick-change lock assembly and a nut assembly of a locking device according to some embodiments of the present application are respectively installed on a battery pack beam and a vehicle body beam. FIG. 5 is a sectional view of a state before a quick-change lock assembly is installed on a nut assembly. FIG. 6 is a schematic diagram illustrating a state after a battery pack beam is locked to a vehicle body beam using a locking device according to some embodiments of the present application.

First, the configuration of the quick-change lock assembly 100 of the locking device 300 of the present application will be described with reference to FIG. 1 and FIG. 3.

As shown in FIG. 1 and FIG. 3, the quick-change lock assembly 100 comprises a shell 101, a quick-change bolt 103, an elastic member 105, a bolt driving rod 107 and a locking mechanism 109. The shell 101 has a substantially cylindrical structure with a hollow cavity formed therein, and an opening 111 formed in the top wall. In some embodiments, a boss 113 is further formed at the top of the shell 101, and the outer ring of the boss 113 has a toothed structure for pressing the shell 101 into a battery pack beam 404 of a new energy vehicle by means of interference fit, as will be described later.

The quick-change bolt 103 is arranged in the cavity and is configured to be able to move axially, so as to protrude from or be accommodated in the cavity via the opening 111. In other words, the quick-change bolt 103 forms a clearance fit with the shell 101. A through hole 301 is axially formed in the quick-change bolt 103 for being matched with a bolt matching section 115 of the bolt driving rod 107 to be described below. In some embodiments, the quick-change bolt 103 may be provided with a trapezoidal thread whereby the service life of the bolt can be improved.

The bolt driving rod 107 comprises the bolt matching section 115, a flange portion 117 and a tool matching section 119. The bolt matching section 115 is configured to be slidably inserted into the through hole 301, and matched with the through hole 301 such that the quick-change bolt 103 is rotatable with the bolt driving rod 107. A first side surface (upper surface in FIG. 1), opposite to the quick-change bolt 103, of the flange portion 117 can abut against the bottom of the quick-change bolt 103, such that when the quick-change bolt 103 is installed, the quick-change bolt 103 can be pushed to move axially. The tool matching section 119 is configured to be matched with a tool, and when a battery is locked or disassembled, the tool drives the tool matching section 119 to rotate, so as to drive the quick-change bolt 103 to rotate via the bolt matching section 115, thereby realizing the tightening or disassembly of the quick-change bolt 103. Although not explicitly shown in the figures, as would be understood by those skilled in the art, for example, the tool matching section 119 may be internally formed with a polygonal through hole, and the front end of the tool may be a polygonal prism to fit therewith, such that the tool is able to drive the tool matching section 119 to rotate.

In some embodiments, as shown in FIG. 1, the bolt matching section 115 comprises a guide portion 121 and a driving portion 123. The guide portion 121 may be formed in a round rod shape, and the driving portion 123 may be formed in a polygonal prism shape. Correspondingly, as shown in FIG. 3, the through hole 301 comprises a first through hole section 303 and a second through hole section 305. The cross section of the first through hole section 303 may be less than the cross section of the second through hole section 305. The first through hole section 303 may be formed as a through hole of which the shape is corresponding to the guide portion 121 and which has a circular cross section. The guide portion 121 is configured to be inserted into the first through hole section 303, to guide the insertion of the bolt driving rod 107. The second through hole section 305 may be formed as a polygonal through hole of which the shape is corresponding to the driving portion 123. The driving portion 123 is configured to be inserted into the second through hole section 305, and matched with the second through hole section 305, enabling the quick-change bolt 103 to rotate with the bolt driving rod 107. Alternatively, in some other embodiments, the driving portion 123 may be in spline fit with the second through hole section 305. Here, it should be noted that in the embodiment where the through hole 301 comprises the first through hole section 303 and the second through hole section 305, the length of the second through hole section 305 needs to be appropriately selected such that after the quick-change bolt 103 is tightened to the quick-change nut, and the bolt driving rod 107 is reset, the driving portion 123 does not come out of the second through hole section 305.

Both ends of the elastic member 105 respectively abut against the inner top wall of the shell 101 and the first side surface of the flange portion 117. Therefore, when the elastic member 105 resets after being compressed, the elastic member 105 pushes the flange portion 117 in a direction away from the inner top wall of the shell 101. In some embodiments, the elastic member 105 may be a spring. In these embodiments, the spring can be sleeved on the outer side of the quick-change bolt 103.

The locking mechanism 109 has a circular shape corresponding to the shell 101, and is fixed to the shell 101. In some embodiments, the locking mechanism 109 can be locked with the shell 101 via a threaded connection. In some embodiments, the locking mechanism 109 may be formed in the shape of a pit on the inner side for accommodating the flange portion 117 of the bolt driving rod 107. Here, it should be noted that when the locking mechanism 109 is fixed to the shell 101, the elastic member 105 has been brought into a compressed state. Therefore, at this time, the flange portion 117 is pushed by the elastic member 105, and the lock mechanism 109 abuts against a second side surface, on the side opposite to the first side surface, of the flange portion 117. The locking mechanism 109 is provided with an opening 125 from which the tool matching section 119 protrudes. First anti-loosening teeth 127 are provided on the second side surface of the flange portion 117, second anti-loosening teeth 129 are provided on the side, abutting against the flange portion 117, of the locking mechanism 109, and the second anti-loosening teeth 129 adapt to be engaged with the first anti-loosening teeth 127 for locking or disengaged from the same for unlocking.

In some embodiments, the first anti-loosening teeth 127 and the second anti-loosening teeth 129 are inclined toothed structures. In these embodiments, the angle of inclination of the first anti-loosening teeth 127 and the second anti-loosening teeth 129 is preferably 30°-60°.

Next, the configuration of the nut assembly 200 of the locking device of the present application will be described with reference to FIG. 2 and FIG. 3.

The nut assembly 200 comprises a cover plate 201, a quick-change nut 203 and a base 205. The quick-change nut 203 is provided with a nut body 207 and a cap portion 209 connected to the nut body 207. The nut body 207 is provided with a through threaded hole which is matched with the quick-change bolt 103. An accommodating space is formed between the cover plate 201 and the base 205. In some embodiments, the cover plate 201 may be formed in a substantially rectangular plate shape protruding in the middle, and the base 205 may be formed in a substantially rectangular plate shape. Thus, the accommodating space may be formed between the cover plate 201 and the base 205. In some embodiments, threaded holes 211 may be formed at four corners of the cover plate 201, and through holes 213 may be formed at the positions, corresponding to the threaded holes 211, of the base 205. Thus, the cover plate can be fixedly connected to a vehicle body beam 402 of the new energy vehicle, for example, by bolts 406 as shown in FIG. 4, as will be described later. The cap portion 209 of the quick-change nut 203 is arranged in the accommodating space. The accommodating space is configured to allow the quick-change nut 203 to move within a predetermined range, thereby ensuring that the quick-change nut 203 is aligned with the quick-change lock assembly 100. The base 205 is provided with an opening 215 from which the nut body 207 protrudes. The diameter of the opening 215 is greater than the diameter of the outer ring of the nut body 207, thereby allowing the quick change nut 203 to move within the predetermined range as described above.

In some embodiments, a flanging 217 is provided on the base 205 to limit rotation of the quick-change nut 203 relative to the base 205. Alternatively, in some other embodiments, the flanging 217 may also be provided on one side of the cover plate 201. Alternatively, flangings 217 may be provided on both the base 205 and the cover plate 201.

In some embodiments, the cover plate 201 is provided with an opening 219 from which the quick-change bolt 103 protrudes. Therefore, the quick-change bolts with different lengths 103 are allowed to be accommodated.

Next, with reference to FIG. 4, an embodiment of locking a battery pack to a vehicle body of the new energy vehicle by using the quick-change lock assembly 100 and the nut assembly 200 of the present application is illustrated.

As shown in FIG. 4, a substantially circular hole 414 corresponding to the shape of the shell 101 of the quick-change lock assembly 100 is formed in the battery pack beam 404 of the new energy vehicle. During installation, the boss 113 of the shell 101 is aligned with the circular hole 414, the shell 101 of the quick-change lock assembly 100 is pressed into the battery pack beam 404 through interference fit of the toothed structure for riveting and fixing, achieving quick installation of the quick-change lock assembly 100 and the battery pack beam 404.

On the other hand, a substantially rectangular groove 408 corresponding to the appearance of the nut assembly 200 is formed in the vehicle body beam 402 of the new energy vehicle. The nut assembly 200 is arranged in the groove 408 and supported by the groove 408. Through holes 410 are formed in the positions, corresponding to the threaded holes 211 of the nut assembly 200, of the groove 408. The bolts 406 are inserted into the through holes 410 and matched with the threaded holes 211 to fix the nut assembly 200 into the groove 408 of the vehicle body beam 402. An opening 412 is formed in the position, corresponding to the nut body 207 of the nut assembly 200, of the groove 408, and the nut body 207 passes through the opening 412 to cooperate with the quick-change bolt 103 of the quick-change lock assembly 100 to achieve locking.

During installation, as shown in FIG. 5, a tool is used to drive the bolt driving rod 107 to rotate via the tool matching section 119 of the bolt driving rod 107, whereby the bolt driving rod 107 also drives the quick-change bolt 103 to rotate via the bolt matching section 115 until the quick-change bolt 103 is in threaded connection with the quick-change nut 203 to achieve tightening. During such process, both ends of the elastic member 105 respectively abut against the inner top wall of the shell 101 and the first side surface of the flange portion 117, such that the elastic member 105 is further compressed. When the quick-change bolt 103 is tightened, the tool is removed, and the bolt driving rod 107 is reset by the elastic member 105. As previously described, since the elastic member 105 is already in the compressed state when the locking mechanism 109 is fixed to the shell 101, i.e., before starting to rotate the quick-change bolt 103, even if the bolt driving rod 107 is reset, the elastic member 105 still pushes the bolt driving rod 107, thereby causing the bolt driving rod 107 to abut against the locking mechanism 109. Thus, the first locking teeth 127 provided on the first side surface of the flange portion 117 of the bolt driving rod 107 are engaged with the second locking teeth 129 provided on the locking mechanism 109. By means of engagement of the anti-loosening teeth, it is possible to prevent the quick-change bolt 103 from loosening.

FIG. 6 illustrates the schematic diagram showing the state after the battery pack beam is locked to the vehicle body beam using the locking device. According to the locking device of the present application, particularly the one-piece quick-change lock assembly of the present application, quick assembly of the locking device can be achieved, and meanwhile, the anti-loosening and anti-rotation effects are achieved.

It should be understood that although the locking device is described above in connection with the power battery of the new energy vehicle, the locking device is not limited to being only applied to the power battery, but may also be applied to other locking scenarios.

Finally, it should be noted that the above embodiments are merely used for illustrating rather than limiting the technical solutions of the present application. Although the present application has been described in detail with reference to the above various embodiments, those of ordinary skill in the art should understand that the technical solutions recorded in the above various embodiments can still be modified, or some of the technical features therein can be equivalently substituted. However, such modifications or substitutions do not make the essence of the corresponding technical solutions depart from the spirit and scope of the technical solutions of the various embodiments of the present application.

What is claimed is:

1. A quick-change lock assembly, comprising:
   a shell with a hollow cavity formed therein;
   a quick-change bolt arranged in the cavity, and internally provided with a through hole along the axial direction, the quick-change bolt being capable of moving axially to protrude from the cavity or being accommodated in the cavity;

a bolt driving rod, comprising a bolt matching section, a flange portion and a tool matching section, wherein the bolt matching section is configured to be slidably inserted into the through hole, and matched with the through hole such that the quick-change bolt is rotatable with the bolt driving rod, and a first side surface, opposite to the quick-change bolt, of the flange portion is configured to be able to push the quick-change bolt to move axially;

an elastic member, both ends of which respectively abut against the inner top wall of the shell and the first side surface of the flange portion; and a locking mechanism fixed to the shell, wherein the locking mechanism abuts against a second side surface of the flange portion, the locking mechanism is provided with an opening from which the tool matching section protrudes, and the second side surface is located on the opposite side of the first side surface, wherein first anti-loosening teeth are provided on the second side surface of the flange portion, and the locking mechanism is provided with second anti-loosening teeth adapted to be engaged with the first anti-loosening teeth for locking or disengaged from the same for unlocking.

2. The quick-change lock assembly according to claim 1, wherein
the first anti-loosening teeth and the second anti-loosening teeth are inclined toothed structures.

3. The quick-change lock assembly according to claim 2, wherein
the angle of inclination of the first anti-loosening teeth and the second anti-loosening teeth is 30°-60°.

4. The quick-change lock assembly according to claim 1, wherein
the quick-change bolt is provided with a trapezoidal thread.

5. The quick-change lock assembly according to claim 1, wherein
the through hole comprises a first through hole section and a second through hole section, the cross section of the first through hole section is less than the cross section of the second through hole section,
the bolt matching section comprises a guide portion and a driving portion, the guide portion is configured to be inserted into the first through hole section to guide the insertion of the bolt driving rod, and the driving portion is configured to be inserted into the second through hole section to be matched with the second through hole section, enabling the quick-change bolt to rotate with the bolt driving rod.

6. The quick-change lock assembly according to claim 5, wherein
the cross sections of the driving portion and the second through hole section are polygonal, or
the driving portion is in spline fit with the second through hole section.

7. The quick-change lock assembly according to claim 1, wherein
a boss is formed at the top of the shell, and the outer ring of the boss has a toothed structure.

8. A locking device, comprising:
the quick-change lock assembly according to claim 1; and
a nut assembly comprising a quick-change nut, the quick-change nut comprising a nut body in which a through threaded hole matched with the quick-change bolt is formed.

9. The locking device according to claim 8, wherein the nut assembly further comprises:
a cover plate; and
a base, the cover plate being fixedly connected to the base, and an accommodating space being formed between the cover plate and the base;
the quick-change nut further comprises a cap portion connected to the nut body, the cap portion is arranged in the accommodating space, the base is provided with an opening from which the nut body protrudes, and
the accommodating space is configured to allow the quick-change nut to move within a predetermined range.

10. The locking device according to claim 9, wherein
a flanging is provided on the base and/or the cover plate, and the flanging is configured to limit the rotation of the quick-change nut relative to the base and/or the cover plate.

11. The locking device according to claim 9, wherein
the cover plate is provided with an opening from which the quick-change bolt protrudes.

12. A vehicle, comprising:
a battery pack beam with a hole formed therein;
a vehicle body beam with a groove formed therein; and
the locking device according to claim 8,
wherein the nut assembly is fixed into the groove of the vehicle body beam, and the quick-change lock assembly is fixed into the hole of the battery pack beam.

* * * * *